INVENTOR
Alyre COULOMBE
By Pierre Lesperance
AGENT

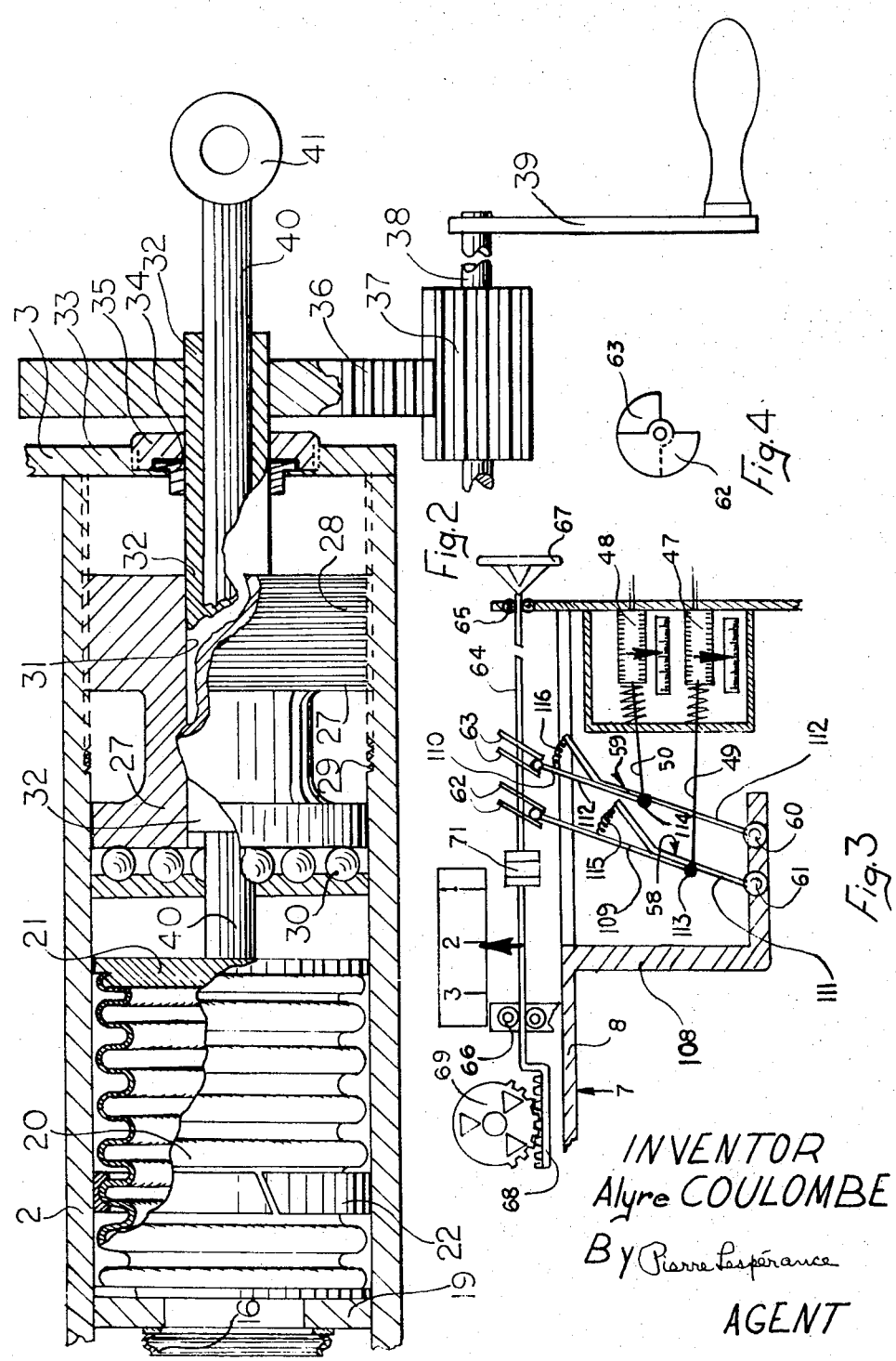

United States Patent Office 3,368,757
Patented Feb. 13, 1968

3,368,757
MONITOR AND CONTROL FOR PROCESS VARIABLES
Alyre Coulombe, 11170 Parc Georges,
Montreal North, Quebec, Canada
Filed Oct. 3, 1966, Ser. No. 583,667
6 Claims. (Cl. 236—51)

ABSTRACT OF THE DISCLOSURE

This invention concerns a system for monitoring a process variable and for varying the adjustment thereof from a remote location, said system comprising a first bellows for actuating the setting member of a regulator of a process variable, a second remotely located bellows interconnected to the first bellows by a fluid line, means for contracting and expanding the second bellows to vary the amount of fluid injected in the first bellows, to thereby cause the adjustment of the regulator setting members, the second bellows being associated with temperature compensating bellows, in turn connected to a fluid line running adjacent to first fluid line and subjected to the same ambient temperature, whereby to automatically compensate for the variations of temperature along the fluid lines, so as to maintain the adjustment of the first bellows despite variations of temperature.

---

The present invention relates to an apparatus for monitoring any type of process variables and for controlling the same so as to vary their adjustment from a remote location.

An object of the present invention resides in the provision of a system of the character described, which is fluid-operated by liquid or gas under pressure and which is very accurate in its operation despite the distance separating the process variable to be monitored and controlled and the monitoring and controlling apparatus.

Another object of the present invention resides in the provision of a system of the character described, in which a monitoring and controlling lines are compensated automatically for changes of the ambient temperature along these lines.

Another object of the present invention resides in the provision of a system of the character described, in which the control of the adjustment of the process variables may be either automatically or manually effected.

The foregoing and other important objects of the present invention will become more apparent during the following disclosure and by referring to the drawings, in which:

FIGURE 2 is a longitudinal section, on an enlarged scale, of a portion of the apparatus shown in FIGURE 1;

FIGURE 3 is a side view of part of the apparatus of FIGURE 1; and

FIGURE 4 is a cross-section of the actuating rod showing the cam plates in front view.

Figure 1:
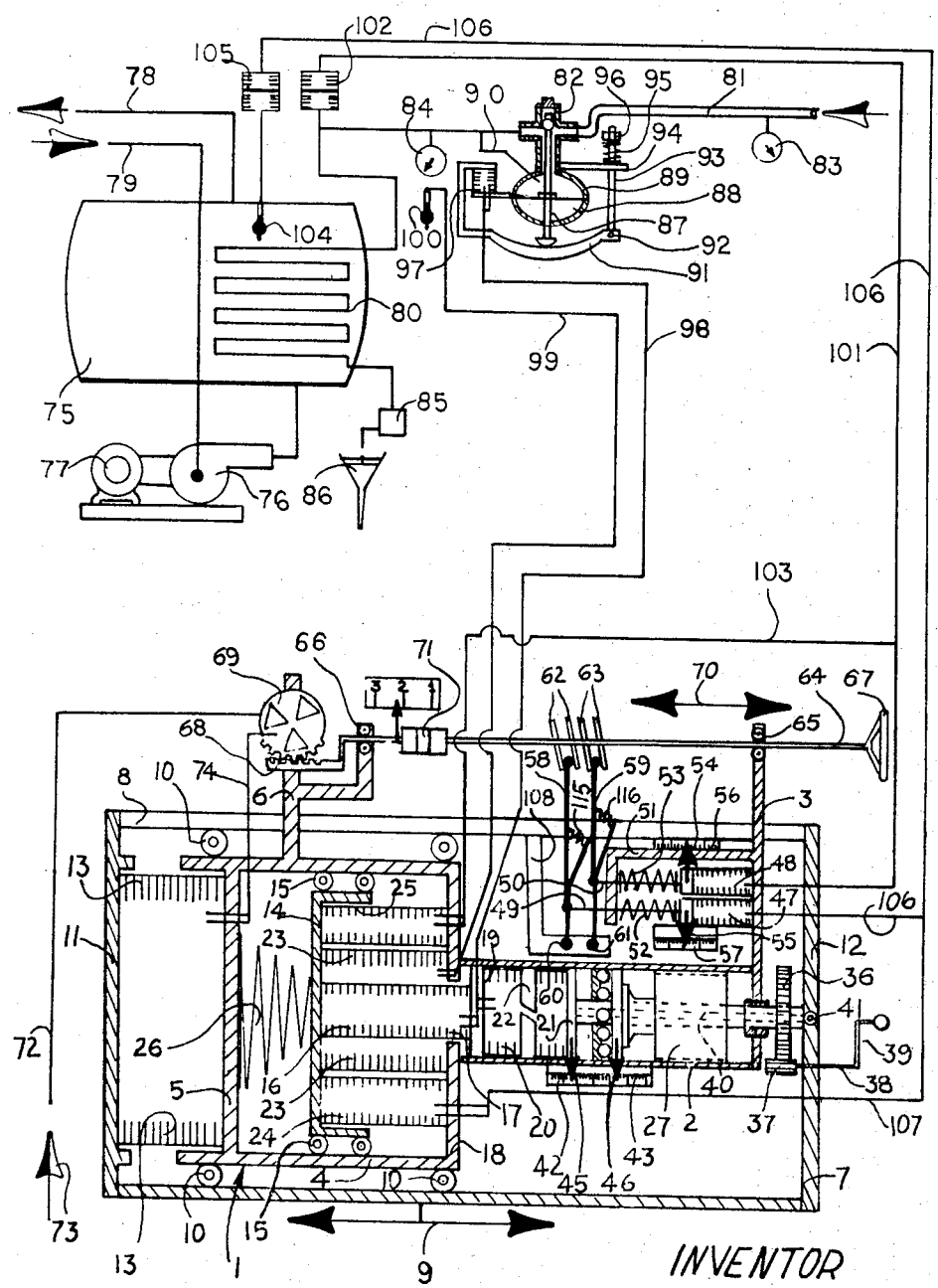
FIGURE 1 is a longitudinal section of the monitor and control apparatus associated and connected in a diagrammatic circuit including two process variables to be controlled and monitored.

Referring now more particularly to the drawings in which like reference characters indicate like elements throughout, the apparatus in accordance with the invention comprises a stationarily mounted framework 1 including a cylindrical tube 2 secured at one end to an upstanding arm 3 and secured at the other end to and in communication with the interior of an enlarged cylindrical box-like casing 4 having a bottom 5 and supported by an upstanding arm 6. The arms 3 and 6 are rigidly secured at their outer ends to stationary supports (not shown).

An exterior movable housing 7 surrounds the framework 1 and is provided with a longitudinal slot 8 for the free passage of arms 3 and 6. The housing 7 is movable longitudinally of framework 1 in accordance with double arrow 9 by being mounted, guided and supported by rollers 10 located between casing 4 and housing 7. Housing 7 is of cylindrical shape and surrounds the framework 1. Housing 7 has a back wall 11 and a front wall 12.

The housing 7 is longitudinally displaceable in accordance with double arrow 9 relative to framework 1 by means of a relatively large diameter bellows 13 disposed between the back wall 11 of housing 7 and the bottom 5 of casing 4. Bellows 13 is of conventional construction and made of metallic foil, and is secured at least to bottom 5. Within casing 4, is mounted a cap 14 which is longitudinally displaceable with respect to casing 4 in accordance with double arrow 9 being supported and guided by rollers 15 disposed intermediate the cylindrical flange of cap 14 and the casing 4.

A central bellows 16 is attached at one end and closed by the cap 14 at the center thereof and extends forwardly through an opening 17 made in the center of the front wall 18 of casing 4 to be attached to a ring 19 which is securily mounted within the rear end of tube 2.

Forwardly of ring 19, central bellows 16 communicates with an additional central bellows 20 extending within tube 2 and closed at its front end by a cap 21 which slidably fits within tube 2 and can move longitudinally within the same. At least one spacer ring 22 surrounds bellows 20 intermediate the ends thereof and serves to center the bellows with respect to tube 2 and is slidable on the inside surface of tube 2.

Bellows 16 and 20 are in communication with each other through ring 19. Bellows 20 serves as an injector bellows. There is disposed within casing 4, a compensator bellows 23 which is secured to and forms a tight connection with cap 14 at one end and which is secured to and forms a tight connection with front wall 18 of casing 4 at the other end. Compensator bellows 23 completely surrounds the central bellows 16 and its annular space is closed by cap 21 at one end and by ring 19 at the other end, together with central bellows 16.

Surrounding compensator bellows 23, are two series of relatively small diameter bellows 24 and 25 which are equally angularly spaced around the compensator bellows 23 and are in alternate disposition, that is bellows 24 alternate with bellows 25. Bellows 24 are thermal compensator bellows and bellows 25 are pressure compensator bellows in the specific application shown in the drawings and to be later explained.

To compensate for the inertia of the bellows 16, 23, 24, and 25 and to overcome the sum of the internal forces exterted by these bellows, except bellows 23 which is the master compensator, there is provided a compression coil spring 26 disposed between cap 14 and bottom 5 of casing 4, and therefore acting to compress the above-indicated bellows 16, 23, 24, and 25. Ahead of terminal cap 21 of additional central bellows 20, is mounted within tube 2 a piston 27 having external threads 28 threadedly engaging internal thread 29 made in the inner surface of tube 2.

The face of piston 27 opposite terminal cap 21 is provided with a ball bearing arrangement 30 to decrease friction between the piston 27 and terminal cap 21 when piston 27 is screwed within tube 2 to displace said piston towards or away from bellows 20.

Piston 27 has a central square bore 31 extending therethrough and in which is slidably mounted a hollow rod 32 of square cross-section.

Hollow rod 32 extends forwardly from piston 27 through the front closure 33 of tube 2, wherein it is rotatably mounted by having a circular portion 34 which is in liquid-proof engagement with said front closure 33 by means of packing 35. Hollow rod 32 has its square front end rigidly secured to a gear wheel 36 meshing with a pinion 37 which is mounted on a shaft 38 provided with a crank handle 39.

Shaft 38 extends through the front wall 12 of housing 7 and is journalled therein and pinion 37 has sufficient length to remain in meshing engagement with gear wheel 36 despite displacement of housing 7 relative to gear wheel 36, the latter being held against longitudinal displacement with respect to stationary framework 1 together with hollow rod 32.

Within hollow rod 32 is disposed a central rod 40, of circular cross-section, engaging the circular shaped bore of hollow rod 32.

Circular rod 40 extends completely through the piston 27 and abuts at one end against the terminal cap 21 of additional bellows 20, while the other end of rod 40 extends forwardly of gear wheel 36 and is provided with an eye 41 for attaching said rod 40 to the front wall 12 of housing 7.

Scales of graduations 42 and 43 are mounted on tube 2 and are associated with terminal cap 21 of bellows 20 and with piston 27 respectively, that is the positions of terminal cap 21 and piston 27 may be read on scales 42 and 43 respectively, as schematically indicated by arrows 45 and 46 associated with the cap and piston respectively.

Two small diameter bellows 47 and 48 are secured at one end to arm 3 of framework 1, while their other closed end is secured to a guide rod 49 and 50 respectively, guided by and freely extending through an extension 51 secured to arm 3.

A coil spring 52, 53 surrounds the guide rods 49 and 50 and abut at one end against the extension 51 and at the other end against the free movable ends of bellows 47 and 48.

Links 58 and 59 are respectively pivotally connected intermediate their ends to the other ends of guide rods 49 and 50, are in turn pivotally connected at their lower ends to an arm 108 secured to housing 7, at 60 and 61 respectively, while their upper ends freely extend through housing slot 8 and engage respectively between a pair of inclined cam plates 62, 63 respectively, adjustably secured to an actuator rod 64.

As shown in FIGURE 3, each link 58, 59 is made of two overlapping sections, namely upper sections 109, 110 and lower sections 111, 112 pivotally connected at 113, 114 and resiliently maintained in alignment by tension springs 115, 116. The upper section may break relative to the lower section only in an anti-clockwise direction, as seen in FIGURE 3.

Actuator rod 64 is supported by arms 3 and 6 at 65 and 66 for longitudinal guided movement and also for rotatable movement about its long axis. One end of actuator rod 64 is provided with an actuating knob or wheel 67 secured thereto, while the other end is offset and provides gear teeth 68 serving to rotate the rotor part of a rotatable three-way valve 69 upon longitudinal displacement of actuator rod 64 in accordance with double arrow 70.

Rotation of actuator rod 64 does not rotate the offset portion carrying the gear teeth 68 due to the presence of a joint 71 within the actuator rod allowing rotation of the actuator rod proper with respect to its offset gear teeth carrying portion, but making these two parts solidary of each other for the longitudinal movement.

Three-way valve 69 is connected to an intake fluid line 72, in turn connected to a source of fluid under pressure, as indicated by arrow 73.

Valve 69 furthermore has another port connected to a line 74 opening within the main actuator bellows 13 for supplying fluid under pressure thereto from the supply indicated by arrow 73. Furthermore, valve 69 has a third port opening to atmosphere. Thus, the valve is operable to connect the bellows 13, either to the source of fluid under pressure position 1 of FIGURE 3, or to atmosphere (position 3) for discharging said bellows. The valve can also take a neutral position (position 2) in which communication between the ports is closed.

Each pair of cam plates 62, 63 are substantially semi-circular in shape, and one pair is ingularly offset through 90° with respect to the other, so that they partially overlap when seen along the actuator rod 64, as shown in FIGURE 4 and rod 64 therefore has four rotated positions; namely: a first position in which only link 58 is engaged by its cam plates 62, while the other link 69 is free of the cam plates 63; a second position in which both links 58, 59 are engaged by cam plates 62, 63 respectively; a third position in which only link 59 is engaged by cam plates 63 while link 58 is clear of its cam plates 62; and a fourth position in which both links 58 and 59 are clear of cam plates 62 and 63.

In the application shown, the temperature and the pressure are the two process variables to be monitored and controlled, in a system comprising a tank 75 filled, say, with a liquid 76 operated by a pump 76 operated by electric motor 77. The tank is emptied through outlet pipe 78, while the pump is provided with a liquid inlet pipe 79. The liquid within tank 75 is heated by a steam coil 80. Coil 80 is fed with steam through steam supply pipe 81 and which is series-connected with a pressure reducing valve 82. Manometers 83 and 84 indicate the steam pressure on the upstream and downstream sides of valve 82 respectively. The steam condensate is evacuated through steam trap 85 to the drain indicated at 86, or is returned to the boiler.

Pressure reducing valve 82 is of the type in which the valve stem 87 is secured to a diaphragm 88 of a diaphragm chamber 89 fed by steam line 90 from the downstream side of the supply pipe 81. Downward movement of valve stem 87 closes the valve and said downward movement is effected by pressure on diaphragm 88 in diaphragm chamber 89, under the action of the steam supplied by line 90. A yoke 91 engages the lower end of valve stem 87, is pivotally connected at one end at 92 to the lower end of a bolt 93 freely extending through a support 94 secured to the valve body and resiliently supported by a spring 95 surrounding the bolt 93 and abutting against the top of support 94 and against a screw 96 screwed on the upper end of bolt 93. The other portion of the yoke 91 forms an upwardly extending L-shaped arm resting on a bellows 97, the lower end of which is carried by a bracket secured to the valve body.

With this arrangement, when bellows 97 is in a predetermined state of expansion, it will cause valve 82 to open and close in a definite range of steam pressure on the downstream side of valve 82. If fluid injection is made in bellows 97 to cause slight expansion of the latter, the opening and closing range of valve 82 will be at higher steam pressure. On the other hand, if fluid is removed from the bellows 97 causing the same to contract slightly, the steam pressure range at which the valve 82 will open and close will be lower.

Injection of fluid within bellows 97 and rejection of fluid therefrom is accomplished through the injector bellows 20 through fluid line 98 connecting said bellows 97 to the bellows 16 and 20.

Because line 98 may be quite long and may extend in the outside, it may be subjected to quite pronounced variations of temperature, thereby causing localized contraction or expansion of the fluid therein, and producing an error in the setting of the bellows 97 with respect to the intended setting of the injector bellows assembly 16, 20. Therefore, a compensating system is provided to offset this error. This compensating system is formed by the master compensator bellows 23 mentioned hereinabove, which is connected to a fluid line 99 extending alongside the fluid line 98 for substantially the entire length thereof and terminated by a bulb 10, or simply closed at its free end, the assembly of line 99 and bulb 100 being such so as to have volume of fluid equal to the volume of fluid in line 98. Because the two lines 98, 99 extend side by side, they are subjected to the same temperature variations and these temperature variations cause expansion or contraction of compensator bellows 23 in a manner to offset the temperature variation on the fluid in line 98. For instance, if the ambient temperature rises along the line 98, bellows 97 would expand more than called for; however, because the fluid in line 99 also expands, it causes expansion of compensating bellows 23 and, consequently, movement towards the left of cap 14 which causes slight expansion of bellows 16, sufficient to take care of the fluid expansion in line 98, thereby resulting in non-movement of bellows 97.

Similarly, if the temperature decreases along lines 98, 99, compensator bellows 23 will contract, causing contraction of bellows 16 to offset the contraction of the fluid in line 98.

The actual pressure at the entrance of coil 80 is monitored and measured by pressure-measuring bellows 48 connected by fluid line 101 to a fluid-separating bellows 102, the other side of which is connected to the supply line 81 on the downstream side of the valve 82; the pressure on the reduced pressure side of the steam line 81 actuates the pressure measuring bellows 48 and the actual pressure is indicated on scale 56 by arrow 54. Also, fluid line 101 is connected by branch line 103 to the pressure line compensator bellows 25, which compensate for the fluid volume changes in line 101, due to temperature variations in said line 101, under the control of master compensator bellows 23.

Supposing housing 7 is in a position well to the right of the position shown in FIGURE 1, and in which the ball bearing 30 of piston 27 abuts directly against the terminal cap 21 of bellows 20, manual operation of crank handle 39 in one direction or the other will screw or unscrew the piston 27 within tube 2, so as to contract or expand the injector bellows 20, thereby varying the amount of fluid injected in the valve controlling bellows 97. Thus, the steam pressure on the reduced pressure side of the valve 82 can be adjusted manually from a remote point.

In the new adjusted position of bellows 97, the reduced steam pressure side will be regulated automatically by the diaphragm 88 of valve 82 and will be monitored by pressure measuring bellows 48, while the temperature variation in the fluid lines 98 and 101 will be automatically compensated by the compensator bellows 23 and 25.

It should be noted that the expansion and contraction of bellows 16, 24, and 25 are controlled by the compensator bellows 23.

The other process variable to be measured and controlled in the example shown is the temperature of the liquid in tank 75. For this purpose, a temperature sensitive bulb 104 is immersed in the liquid in tank 75 and is connected by a fluid line to one side of a fluid separating bellows 105, the other side of which is connected by fluid line 106 to the temperature indicating bellows 47, whereby the temperature is indicated on scale 57 by arrow 55.

Also, a branch line 107 is connected to line 106 and to the thermal line compensator bellows 24; said lastnamed bellows will contract and expand under action of master compensator bellows 23 to allow for change of volume of the fluid in line 106 under temperature variations along said line. If the indicated temperature is too high or too low, crank handle 39 may be rotated to reduce or increase the steam pressure range.

The system works in the above-mentioned manner when both links 58, 59 clear the associated cam plates 62, 63, the actuator rod 64 being rotated in its fourth above-noted position. In this position, the change of the setting of the steam pressure in the coil 80 is manually effected by the crank handle 39. However, when the actuator rod 64 is rotated to its third position whereby link 59 engages cam plates 63, link 59 which is operated by the pressure detected by bellows 48, which is an indication of the pressure of the steam in coil 80, will cause remote automatic control of valve 82. If the pressure detected is too high, link 59 will cause axial movement of actuator rod 64 to position 3 of FIGURE 3 to make three-way valve 69 establish connection between bellows 13 and atmosphere, thereby causing the collapse of main bellows 13; therefore, housing 7 moves to the right, as seen in FIGURE 1, causing expansion of central bellows 20 by retraction of inner rod 40 and consequent compression of valve bellows 97, whereby valve 82 closes. In this third position of the actuator rod 64, it is noted that it is the pressure in the steam coil 80 which is controlling. However, the temperature in the tank 75 can be made to control the automatic remote operation of the device. For this, it is only necessary to rotate actuator rod 64 to its first position in which only link 58 is engaged with the cam plates 62 and the second link 59 is disengaged from its associated cam plates 63. Therefore, link 58 operated by the temperature measuring bellows 47 will cause actuation of the three-way valve 69 so as to expand or contract main bellows 13, so as to move housing 7 and, through housing 7, rod 40 will control the contraction and expansion of bellows 20, and therefore the opening and closing of steam valve 82. However, the steam valve 82 can be controlled by a correlation of both the steam pressure in coil 80, and the temperature of the liquid in tank 75 by positioning the actuator rod 64 in its second position, so that both pairs of cam plates 62, 63 will engage the respective links 58 and 59. In this case, the expanding one of bellows 47, 48 will override the other bellows due to the "breaking" of the sectional link of said other bellows.

In practice, all the bellows and associated fluid lines will be completely filled with a liquid having a low freezing point. Also, the space within tube 2 and surrounding the piston 27 and bellows 20 will be preferably filled with a lubricating fluid.

Main bellows 13 is preferably filled with a liquid, although for emergency purpose and for certain applications, it could be operated from a source of compressed air which may include air pressure bottles in case the electrically-operated air compressor fails due to a stoppage of electricity.

While a preferred embodiment in accordance with the invention has been illustrated and described, it is understood that various modifications may be resorted to without departing from the scope of the appended claims.

What I claim is:

1. A remote control for varying the setting of a regulator of a process variable, said regulator having a movable setting member, comprising a first bellows mechanically connected to said setting member for moving the same, a second bellows disposed at a location remote from said first bellows, a fluid filled line connected between said first and second bellows, and means for contracting and expanding said second bellows to vary the amount of fluid injected in said first bellows, thereby to cause contraction and expansion at said first bellows and moving of said setting member a second fluid filled line disposed alongside said first-named fluid filled line and closed at its end near said first bellows, a third bellows in communication with and forming a continuation of said second bellows, a master compensator bellows surrounding said third bellows having a fixed end at the interconnection of said second and third bellows, and having its movable end surrounding the movable end of said third bellows, said second fluid filled line being connected to said master compensator bellows, whereby variations of temperature along said first and second fluid lines will cause said master compensator bellows to expand or contract said third bellows, to keep constant the amount of fluid injected in said first bellows despite variations of temperature along said first-named fluid line.

2. A remote control as claimed in claim 1, wherein said means include a rigid tube surrounding said second bellows, said second bellows having one end secured to said tube, a piston screwed within said tube and facing the opposite end of said second bellows, and manually-operated means to screw and unscrew said piston which in turn acts on said second bellows to expand and contract the same.

3. A remote control as claimed in claim 1, further including a movable cap connected to the movable ends of said third and fourth bellows, a stationary wall connected to the fixed end of said fourth bellows, a fluid filled indicator member exposed to said process variable producing expansion and contraction of the fluid in said member depending on the variation of said process variable, a third fluid filled line connected to said member, a fifth indicator bellows connected to said third fluid filled line whereby variations in the process variable will cause variations in the amount of expansion of said fifth bellows, to indicate said variations, and a sixth compensator bellows disposed between said wall and said cap and connected to said third fluid line to compensate for the change of fluid volume in said third line due to temperature variations along said third line.

4. An apparatus as claimed in claim 3, wherein said last-named fifth bellows surround said fourth bellows and include two series of bellows, the bellows of each series being connected to the fluid line different indicator members, each indicator member associated with a different process variable.

5. An apparatus as claimed in claim 3, further including an actuator rod slidably mounted within said piston and extending therethrough and engageable with the movable end of said second bellows, a seventh bellows connected to said actuator rod for moving the same, three-way valve means for admitting fluid under pressure in said last-named bellows and for exhausting the same so as to move said actuator rod to control the expansion and contraction of said second bellows, and means to operate said three-way valve.

6. An apparatus as claimed in claim 5, wherein said last-named means include a manually-operated actuator rod for operating said three-way valve manually, linkages actuated by said fifth bellows and detachably connectable to said operating rod to control said three-way valve.

References Cited
UNITED STATES PATENTS

| | | | |
|---|---|---|---|
| 1,300,717 | 4/1919 | Fulton | 236—98 |
| 2,362,338 | 11/1944 | Anderson | 236—98 |
| 2,529,875 | 11/1950 | Howard | 236—51 |

FOREIGN PATENTS

| | | |
|---|---|---|
| 987,642 | 4/1951 | France. |

WILLIAM J. WYE, *Primary Examiner.*